United States Patent [19]

Goel et al.

[11] Patent Number: 4,540,767

[45] Date of Patent: Sep. 10, 1985

[54] POLYMERS BASED ON BICYCLIC AMIDE ACETALS/POLYEPOXIDES/POLYISOCYANATES

[75] Inventors: Anil B. Goel, Worthington; Timothy A. Tufts, Columbus, both of Ohio

[73] Assignee: Ashland Oil, Inc., Ashland, Ky.

[21] Appl. No.: 678,133

[22] Filed: Dec. 4, 1984

[51] Int. Cl.$^3$ ............................................. C08G 18/30
[52] U.S. Cl. ..................................... 528/60; 525/454; 528/66; 528/73
[58] Field of Search ............................ 528/60, 66, 73; 525/454

[56] References Cited

U.S. PATENT DOCUMENTS 4,101,527  7/1978  Cunningham et al. ............... 528/73

FOREIGN PATENT DOCUMENTS 2344607  3/1975  Fed. Rep. of Germany .
3235933  3/1984  Fed. Rep. of Germany .

*Primary Examiner*—Maurice J. Welsh
*Attorney, Agent, or Firm*—John F. Jones

[57] ABSTRACT

Novel polymers having excellent physical properties including heat distortion temperatures and izod impact strengths are prepared by the interaction of bicyclic amide acetals with epoxide resins and polyisocyanates.

6 Claims, No Drawings

POLYMERS BASED ON BICYCLIC AMIDE ACETALS/POLYEPOXIDES/POLYISOCYANATES

This invention relates to novel polymers produced from bicyclic amide acetals, polyepoxides and polyisocyanates and more particularly pertains to polymers of this type which have excellent physical properties including high heat distortion temperatures, high notched izod impact strength and the like.

The copolymerization of certain bicyclic amide acetals with certain diisocyanates has been disclosed in West German Pat. No. 3,235,933. The preparation of polymers from bicyclic amide acetals, polyisocyanates and polyepoxides has not been previously disclosed.

The basic polymer obtained by the reaction of a bicyclic amide acetal with a diisocyanate is usually brittle with poor notched izod impact strength. We have discovered that polymers obtained by the interaction of a bicyclic amide acetal, polyepoxide and polyisocyanate have excellent izod impact strength, good heat distortion temperature and other desirable physical properties.

The bicyclic amide acetals useful in this invention include those having the Formula I:

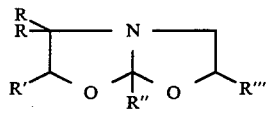

wherein R, R' and R''' each independently represent H, or an alkyl, an aryl, aralkyl or an ether group having from 1 to 18 carbon atoms and R'' represents an alkyl group having from 1 to 18 carbon atoms or an aralkyl group having from 7 to 20 carbon atoms. The bicyclic amide acetals may be bis or polybicyclic amide acetals.

The polyepoxides useful in this invention can be monomeric or polymeric, saturated or unsaturated, aliphatic, cycloaliphatic, aromatic or heterocyclic, and they may be substituted if desired with other substituents besides the epoxy groups, e.g., hydroxyl groups, ether radicals, halogen atoms, and the like. Typical epoxy components suitable in the practice of this invention include those disclosed in U.S. Pat. Nos. 2,500,600 and 2,324,483 which are incorporated here by reference. Preferred in this invention are 1,2-epoxy compounds having an epoxide equivalence greater than 1, that is to say, compounds containing more than one group of the formula

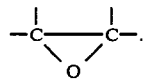

The 1,2-epoxide groups may be either terminal or inner ones. Particularly suitable terminal 1,2-epoxide groups are 1,2-epoxy ethyl or 1,2-epoxy propyl groups. The latter may be linked to an oxygen atom, that is to say they are glycidyl ether or glycidyl ester groups. Compounds with inner epoxide groups usually contain the 1,2-epoxide group in an aliphatic chain or in a cycloaliphatic ring.

As epoxy compounds containing an inner 1,2-epoxy group there are suitable epoxidized diolofins, dienes, or cyclic dienes, such as 1,2,5,6-diepoxy hexane, 1,2,4,5-diepoxy cyclohexane, dicyclopentadiene diepoxide, dipentene diepoxide and more especially vinyl cyclohexene diepoxide; epoxidized diolefinically unsaturated carboxylic acid esters, such as methyl-9,10,12,13-diepoxystearate, or the dimethyl ester of 6,7,10,11-diepoxyhexadecane-1,16-dicarboxylic acid. Furthermore, there may be mentioned epoxidized mono-, di-, or polyesters, mono-,di- or poly-acetals containing at least one cycloaliphatic 5-membered or 6-membered ring, to which at least two 1,2-epoxide groups are linked.

A widely used class of polyepoxides which can be used in the present invention are the epoxy polyethers obtained by reacting a halogen containing epoxide or dihalohydrin, such as epichlorohydrin, epibromohydrin, 3-chloro-1,2-epoxyoctane, and the like with either a polyhydric phenol or a polyhydric alcohol.

Polyisocyanates useful in this invention include organic isocyanates having at least two isocyanate groups per molecule. The polyisocyanates can be of low, high or intermediate molecular weight and can be any of a wide variety of organic polyisocyanates including ethylene diisocyanate, trimethylene diisocyanate, dodecamethylene diisocyanate, hexamethylene diisocyanate, hexamethylene diisocyanate trimer, tetraethylene diisocyanate, pentamethylene diisocyanate, propylene-1,2-diisocyanate, 2,3-dimethyl tetramethylene diisocyanate, butylene-1,2-diisocyanate, butylene-1,3-diisocyanate, 1,4-diisocyanate cyclohexane, cyclopentane-1,3-diisocyanate, p-phenylene diisocyanate, 1-methyl phenylene-2,4-diisocyanate, naphthalene-1,4-diisocyanate, toluene diisocyanate, diphenyl-4,4'-diisocyanate, benzene-1,2,4-triisocyanate, xylylene-1,4-diisocyanate, xylylene-1,3-diisocyanate, 4,4'-diphenyl methane diisocyanate, 4,4'-diphenylene propane diisocyanate, 1,2,3,4-tetraisocyanato butane, butane-1,2,3-triisocyanate, polymethylene polyphenyl isocyanate, and other polyisocyanates having an isocyanate functionality of at least two as more fully disclosed in U.S. Pat. Nos. 3,350,362 and 3,382,215. Polyisocyanates which are polymeric in nature including isocyanate prepolymers of all types are included in this invention.

In the process of this invention one can employ from 1 to 50% by weight of the total reactants of the bicyclic amide acetal, from 5 to 50% by weight of the epoxide resin and from 0.8:1 to 3:1 of isocyante equivalent to total equivalent of combined bicyclic amide acetal and epoxy resin. There also may optionally be included in the reactant mixture from 0 to 50% by weight of a polyol and if such is included, the amount of isocyanate must be adjusted to include the polyol functionality. In determining functionality, the bicyclic amide acetal is considered to be bifunctional and the hydroxyl and epoxy groups are monofunctional.

The optional polyols which may be useful in this invention include polyether polyols, polyester polyols, amide and urethane polyols, polycarbonate polyols and hydroxyl terminated elastomers.

The process of this invention can be conveniently carried out at about room temperature and pressure although the use of temperatures in the range of from room temperature and slightly below up to about 200° C. or slightly higher, and at pressures in the range of from atmospheric or slightly below up to about 100 atmospheres or slightly higher is within the scope of the present invention.

The invention is further illustrated in the following representative Examples.

EXAMPLE 1

A. A bicyclic amide acetal of Formula 1 wherein R, R' and R''' represent H and R'' represents $CH_3$(48 g) and 52 g of a polyepoxide based on bisphenol-A (diglycidyl ether of bisphenol-A equivalent weight range 180–195) were mixed (at room temperature) to give a clear solution. The resulting solution was degassed on a rotary evaporator and mixed with 150 g of degassed diisocyanate liquified 4,4'-methylene bis(phenyl isocyanate) at room temperature to form a clear solution. The resulting solution was poured into a glass mold, the surface of which was coated with a silicone based mold release agent. The material in the mold was then heated at 100° C. for one hour and then at 135° C. for two hours. The resulting transparent solid polymer was found to have a notched izod impact strength of 0.1 foot pounds/inch of notch, an unnotched izod impact strength of 1.5 foot pounds/inch (ASTM D256) and an ASTM D648-56(264 psi) heat distortion temperature (HDT) of 180° C.

B. The procedure of "A" of this Example was repeated except that 35 g of the polyepoxide and 144 g of the diisocyanate were used. The final polymer was found to have a notched izod impact strength of 0.4 foot pound/inch of notch, an unnotched izod impact strength of 5.5 foot pounds/inch and a heat distortion temperature of 138° C.

EXAMPLE 2

This example followed the procedure of Example 1 except that 32 g diglycidyl ether of polypropylene glycol as the polyepoxide (equivalent weight 320) was used and 129 g of the diisocyanate were used. The transparent polymer product showed HDT of 137° C. and notched izod impact strength of 0.75 ft. lbs./inch of notch.

EXAMPLE 3

An epoxy resin was prepared by heating a mixture of 50 g of liquid diglycidyl ether of bis phenol A (DGEBA) (eq.wt. 180–195) and 50 g of carboxyl terminated butadiene/acrylonitrile low molecular weight copolymer at about 120° C. for 1 hour in the presence of 0.5 g of $Ph_3P$ catalyst. A test panel was made by reacting 50 g of the above-described epoxy resin with 48 g of the bicyclic amide acetal and 135 g of the diisocyanate as described in Example 1A. The resulting opaque polymer was found to have a notched izod impact strength of 0.73 foot pounds/inch of notch and a heat distortion temperature of 160° C.

EXAMPLE 4

The epoxy resin used in this experiment was prepared by reacting the liquid DGEBA (eq. wt. 180–195) and carboxyl terminated butadiene/acrylonitrile rubber of Example 3 in a 90:10 weight ratio. The resulting resin containing hydroxyl and epoxy groups was found to have an equivalent weight of about 190. The final polymer product was prepared by mixing 38 g of the foregoing epoxy resin, 48 g of the bicyclic amide acetal and 144 g of the diisocyanate as described in Example 1A and by the procedure described in Example 1A. The resulting polymer was found to have a notched izod impact strength of 1.0 foot pounds/inch of notch and a heat distortion temperature of 135° C.

EXAMPLE 5

A polymer was prepared by the procedure of Example 1A using in the reaction mixture the bicyclic amide acetal, 37 g of the polyepoxide, 25 g of polytetramethylene ether diol (equivalent weight of 492) and 151 g of the diisocyanate. The resulting solid polymer was found to have a notched izod impact strength of 0.64 foot pounds/inch of notch and a heat distortion temperature of 120° C.

EXAMPLE 6

A polymer was prepared as in Example 1A from 48 g of the bicyclic amide acetal, 43 g of a polyepoxide diglycidyl ester of linoleic dimer acid and 127 g of the diisocyanate. The resulting opaque polymer was found to have a notched izod impact strength of 0.8 foot pounds/inch of notch, an unnotched impact strength of 12 foot pounds/inch and a heat distortion temperature of 162° C.

EXAMPLE 7

The procedure of Example 1A was followed using 52 g of the polyepoxide, 48 g of the bicyclic amide acetal, and 136 g. of 4,4'-methylene-bis-(cyclohexyl isocyanate) as the polyisocyanate. The mixture was cured at 120° C. for 3 hours followed by 3 hours at 145° C. to give a solid polymer having a heat distortion temperature of 170° C. and a notched izod impact strength of 0.32 foot pounds/inch of notch.

EXAMPLE 8

The procedure of Example 1A was followed using 65 g of the bicyclic amide acetal which was of Formula I wherein R is $CH_3$, R' is H, R'' is $C_{11}H_{23}$ and R''' is $CH_2OC_4H_9$, 37 g of the polyepoxide and 82 g of the polyisocyanate. A small amount of tertiary amine catalyst (0.2 g) was also used in the reaction mixture. The solid, transparent polymer resulting from the curing was found to have a heat distortion temperature of 148° C. and a notched izod impact strength of 0.2 foot pounds per inch of notch.

We claim:

1. The process comprising reacting a mixture of a bicyclic amide acetal, an epoxy resin and a polyisocyanate at a temperature in the range of from about room temperature up to about 200° C. and at a pressure in the range of from about atmospheric up to about 100 atmospheres, wherein there is employed from 1 to 50% by weight of the total reactants of the bicyclic amide acetal, from 5 to 50% by weight of the total reactants of an eposide resin and from 0.8:1 to 3:1 equivalents of the polyisocyanate per combined equivalents of the bicyclic amide acetal and epoxy resin and wherein the bicyclic amide acetal corresponds to the formula

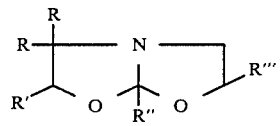

wherein R, R' and R''' each independently represents hydrogen or an alkyl, an aryl, alkaryl or an ether group having from 1 to 18 carbon atoms and R'' represents an alkyl group having from 1 to 18 carbon atoms or an aralkyl group having from 7 to 20 carbon atoms.

2. The process of claim 1 wherein the epoxy resin is a polyepoxide having at least two epoxy groups per molecule.

3. The process of claim 2 wherein the polyisocyanate is one having at least two isocyanate groups per molecule.

4. The process of claim 3 wherein the bicyclic amide acetal is one in which R, R' and R''' are H and R'' is CH$_3$, the epoxy resin is the diglycidyl ether of bisphenol-A, and the polyisocyanate is 4,4'-methylene bis(phenyl isocyanate).

5. The process of claim 3 wherein the bicyclic amide acetal is one in which R, R' and R''' are H and R'' is CH$_3$, the epoxy resin is the diglycidyl ether of polypropylene glycol and the polyisocyanate is 4,4'-methylene bis(phenyl isocyanate).

6. The composition produced by the process of claim 1.

* * * * *